Feb. 9, 1965  G. HIRS  3,169,109
FILTER APPARATUS
Filed April 16, 1962  4 Sheets-Sheet 1

INVENTOR.
GENE HIRS.
BY
Wallace P. Lamb
ATTORNEY.

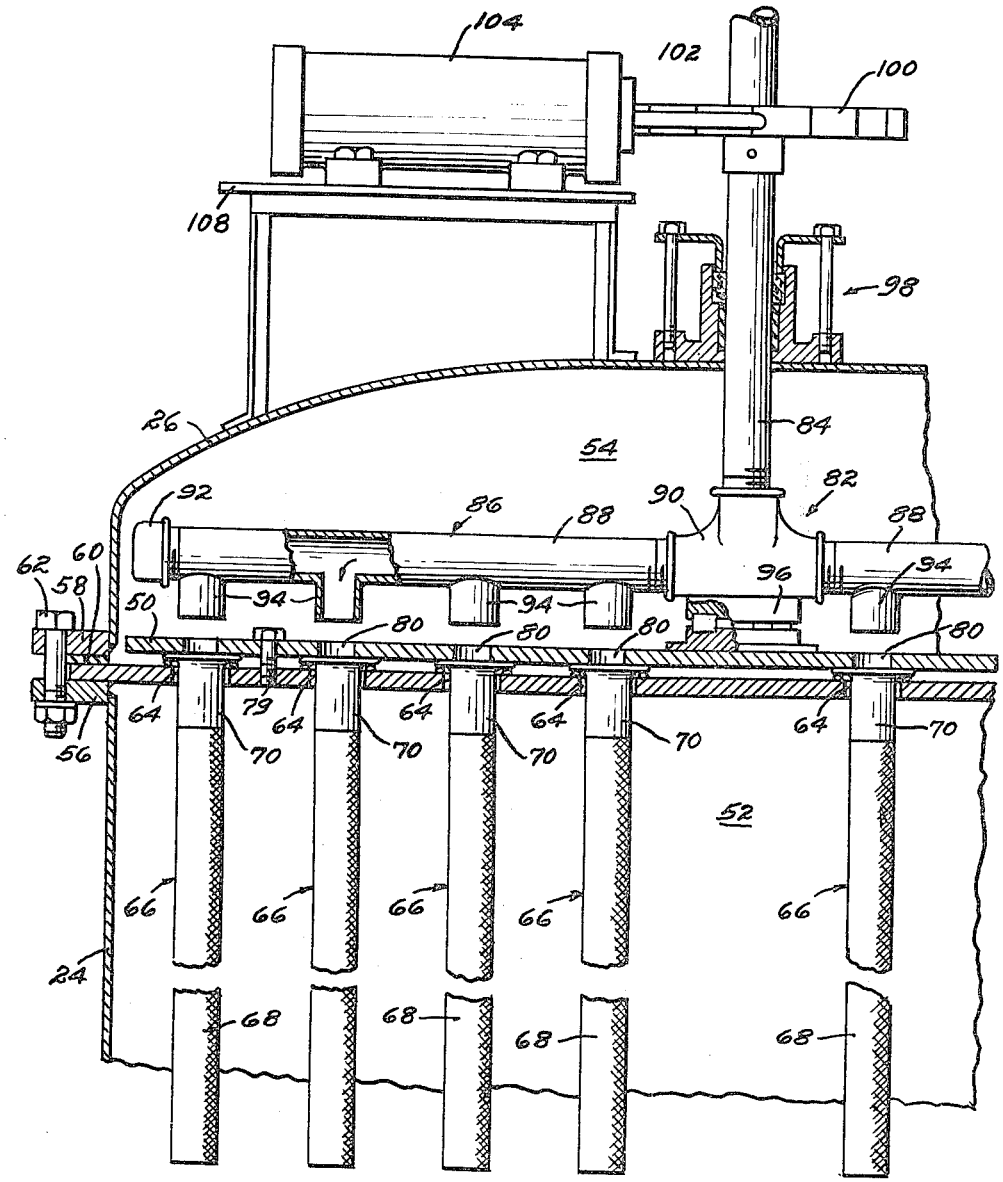

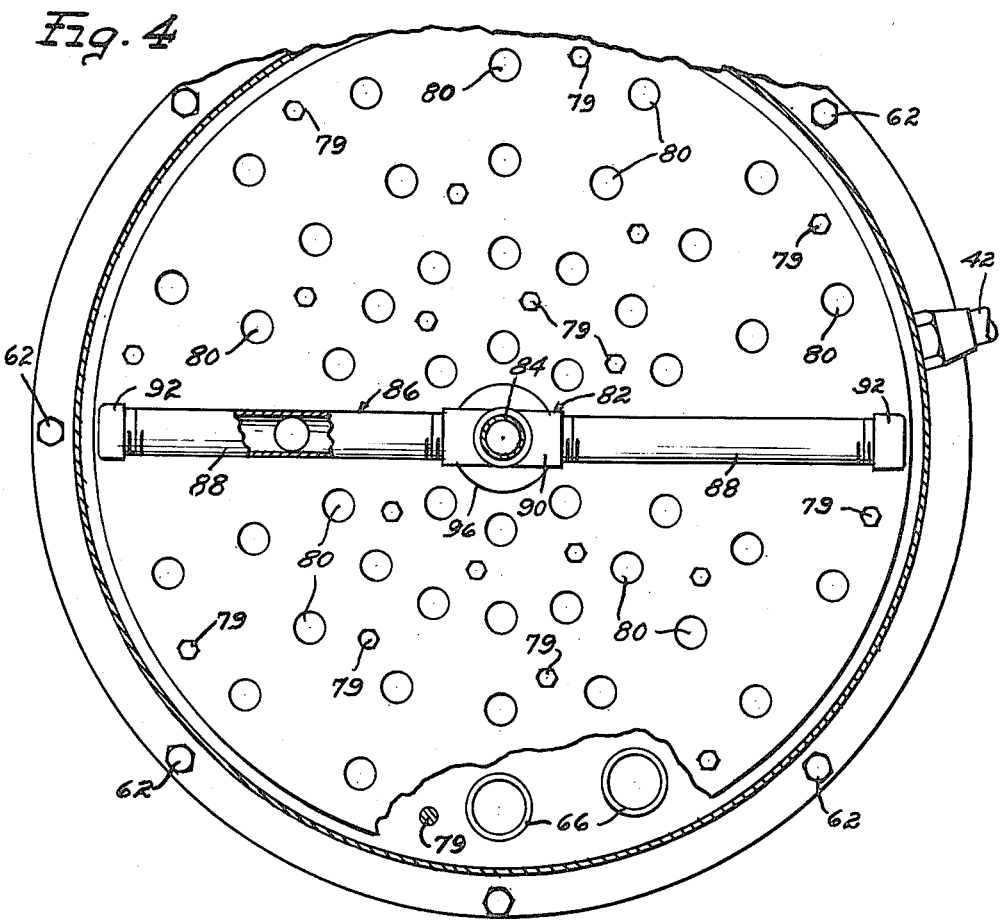
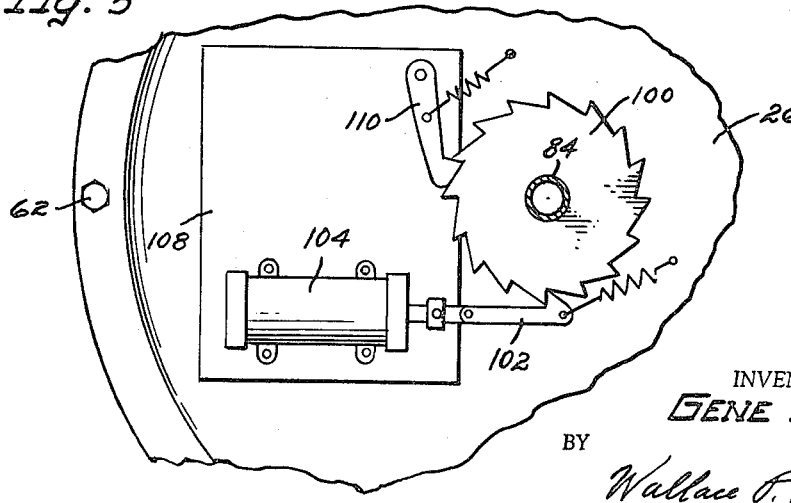

Feb. 9, 1965  G. HIRS  3,169,109
FILTER APPARATUS
Filed April 16, 1962  4 Sheets-Sheet 4

INVENTOR.
GENE HIRS.
BY
Wallace T. Lamb
ATTORNEY.

United States Patent Office 3,169,109
Patented Feb. 9, 1965

3,169,109
FILTER APPARATUS
Gene Hirs, 17208 Greenview Road, Detroit, Mich.
Filed Apr. 16, 1962, Ser. No. 187,835
2 Claims. (Cl. 210—107)

This invention relates generally to filter apparatus and particularly to liquid filter apparatus.

One of the objects of the invention is to provide an improved liquid filter cleaning system for automatically removing filtered out foreign matter from the apparatus.

Another object of the invention is to provide an improved backwash system for removing foreign matter from a pressure filter apparatus.

Another object of the invention is to provide in a pressure filter apparatus for the introduction of high velocity water jets reversely directed through filter elements and distributed to impinge with equal force against the entire area of the elements filter media.

Other objects of the invention will become apparent from the following description, taken in connection with the accompanying drawings in which:

FIG. 3 is an enlarged vertical sectional view of an upper portion of the filter apparatus;

FIG. 4 is a cross sectional view, taken along the line 4—4 of FIG. 1;

FIG. 5 is an enlarged fragmentary view shown partly in plan and partly in section, taken along the line 5—5 of FIG. 1;

Figure 1:
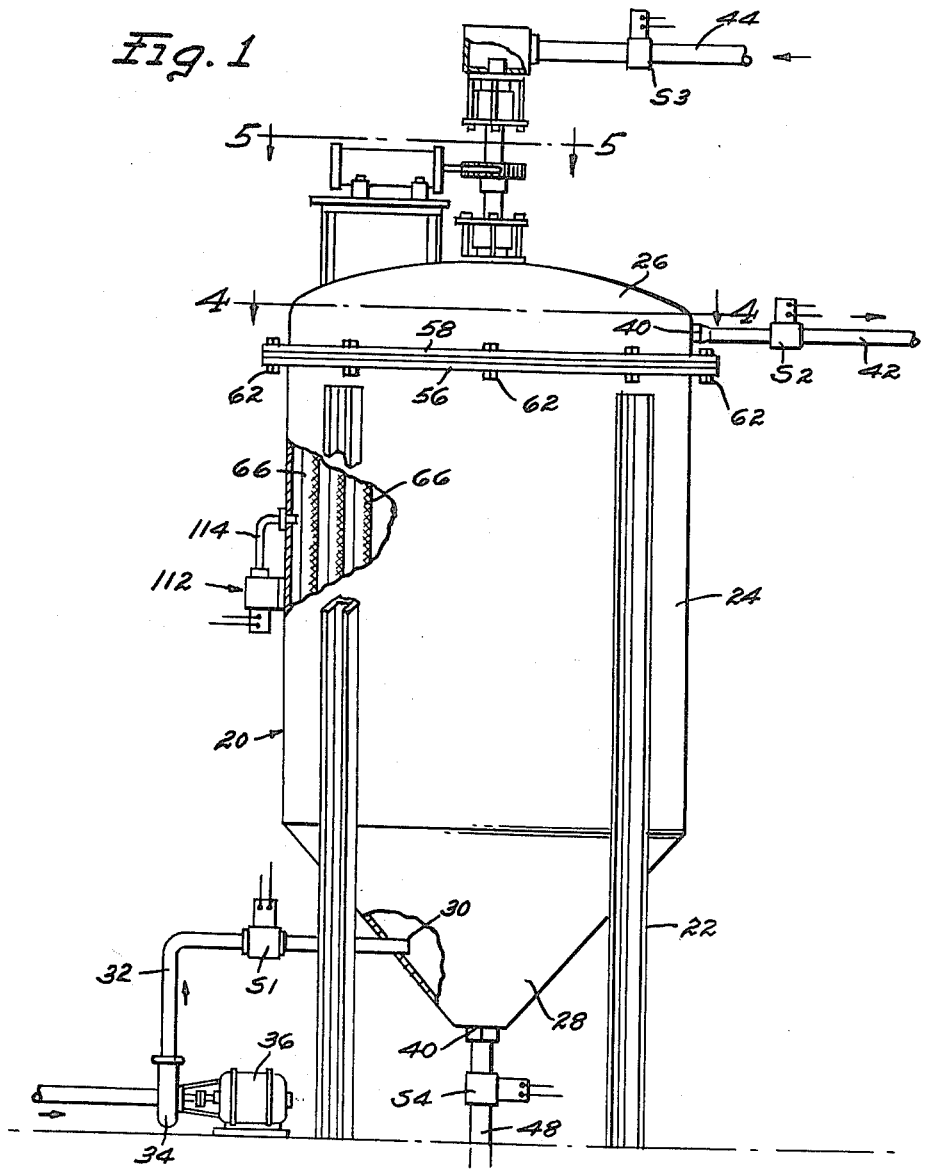
FIG. 1 is an elevational view of a liquid filter apparatus embodying features of my invention.
Figure 2:
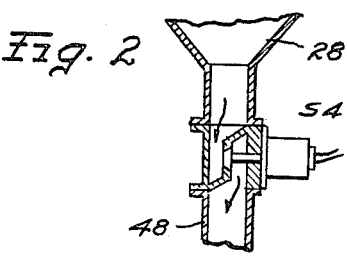
FIG. 2 is a vertical sectional view of a detail.

Referring to the drawings by characters of reference, the filter apparatus shown has a container 20 for connection in a liquid supply system such as a water supply system, and the container may be mounted on a suitable supporting frame 22. The container 20 is preferably constructed of a lower main section 24 and an upper removable section or dome 26. A lower portion 28 of the container 20 is conical in form having an inlet 30 to which contaminated liquid is conducted through a pipe 32 by a suitable pump 34 which may be driven by an electric motor 36. In the supply pipe 32 there is a normally open solenoid valve S1. An outlet 40 for filtered liquid is connected by a pipe 42 to a point or points of use and in the pipe 40 there is a normally open solenoid valve S2.

In the dome of the removable container section 26 there is a backwash inlet connected to a source of water under pressure by a pipe 44 and in this pipe there is a normally closed solenoid valve S3. At the apex of the conical lower end of container 20 there is an outlet 46 for the discharge of foreign matter and unfiltered liquid following the backwash operation and the discharged matter and liquid may be conveyed to a sewer by a discharge pipe 48, or if desired the discharge may be conducted to a second filter. In any event, a normally closed solenoid valve S4 is provided in pipe 48 to control discharge from the outlet 46.

With particular reference to FIG. 3, it will be seen that the lower container section 24 and the upper container section 26 are separated by a horizontal plate 50 providing a lower filter chamber 52 and an upper outlet chamber 54. A margin of the plate 50, around its entire periphery is held between outwardly directed flanges 56 and 58 respectively of the container sections 24 and 26 and sealed against leakage by a suitable gasket 60, displaced by bolts and nuts 62.

Figure 6:
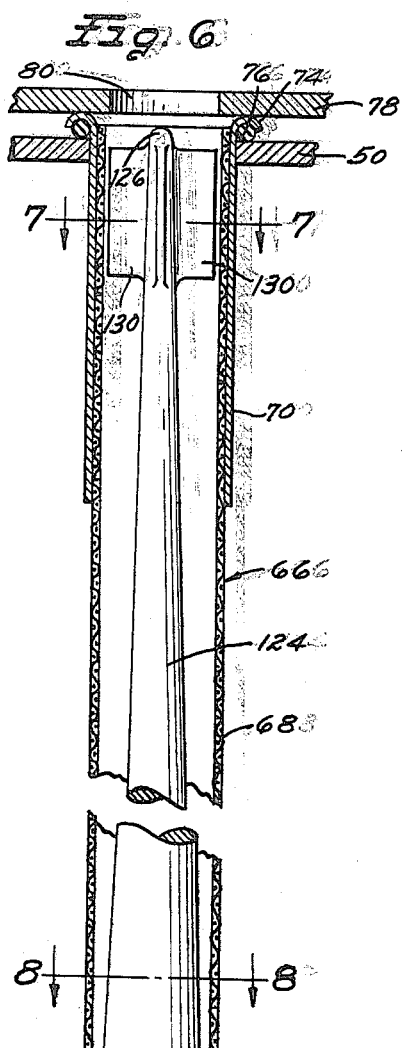
FIG. 6 is an enlarged sectional view of a filter element taken along the line 6—6 of FIG. 3.

In the chamber separating plate 50 there is provided a plurality of holes 64 equally distributed over the plate area for respectively receiving the upper ends of an equal number of tubular filter elements 66. The holes 64 are arranged in radial rows with the rows equally angularly displaced about the center of the plate 50, as illustrated in FIG. 5. As shown in detail in FIG. 6, each of the filter elements 66 comprises a tubular fine mesh screen 68 having a rigid metal sleeve 70 fitted over and welded to the upper end of the sleeve and a rigid metal insert 72 fitted into and welded to the lower end of the screen. At its upper end, the sleeve 70 has an outturned flange 74 under which there is a gasket 76 that seats on the upper surface of plate 50 to seal the joint between the sleeve and plate 50. A clamping plate 78 rests on the upper ends of all of the filter elements 66 and is drawn down tightly by screws 79 to displace the gaskets 76, the plate 78 having holes 80 therethrough which respectively align with the upper open ends of the filter elements. Thus liquid under pump pressure in the filter chamber 52 is caused to flow through the filter element screens 68, through holes 80 into outlet chamber 54 and thence to pipe 42 during the filtering operation. The filter screens 68 may function as the filter media, aided by the foreign matter that collects thereon, or, if desired, any of the well known filter aids such as a diatomaceous material may be employed as a filter in which event a filter aid slurry is circulated through the system to deposit the filter in cake form on the elements prior to activation of the filtering operation.

During the filtering operation, the accumulation of foreign matter on the filter elements 66 will retard the filter rate to the degree that a filter cleaning operation is required. In order to clean all of the foreign matter from the filter element screen particularly where water slimes are present, I provide a backwash system including a rotatable water discharge device 82. The device 82 is mounted in the outlet chamber 54 and comprises, in general, a vertical hollow shaft or pipe 84 which carries at its lower end a header 86 provided by diametrically oppositely disposed pipes 88, connected to pipe 84 by a suitable pipe connection 90. The outer ends of the header pipes 88 are capped, as at 92. Each of the header pipes 88 has a number of downwardly directed water jets 94 which are spaced apart so as to align with the holes 80 of any of the diametrical rows of the holes, as illustrated in FIG. 3. The backwash device 82, after discharging water through a row of the filter elements for an interval calculated to be sufficient to effect the removal of the foreign matter is then rotated to the next row of filter elements and so on until all of the elements have been backwashed, the operation requiring a one-half revolution of the device.

At its lower end the rotatable backwash device 82 may be supported on a suitable bearing 96, mounted on clamping plate 50. The hollow shaft or vertical pipe projects externally through the dome 26 for connection to the clean backwash water pipe 44, a suitable shaft seal 98 being provided and mounted on the top of the container dome.

In order to rotate the backwash device 82, I provide an indexing mechanism comprising, in general, a ratchet wheel 100, and a pawl 102. The ratchet wheel 100 is affixed onto the shaft 84 and the pawl 102 is actuated by a power element 104 such as a solenoid, or air cylinder 104, as desired. Extending above the ratchet wheel 100, an upper end portion of the hollow shaft 84 is rotatably received within a container 105 to which backwash supply pipe 44 is also communicatively connected. A suitable shaft seal 106 is provided to seal the joint between the shaft 84 and the container 105. As shown in FIG. 5, the power element 104 is mounted by means of a bracket 108 on the top of the container dome and also mounted on the bracket is an aligning pawl 110. The number of teeth on the ratchet wheel 100 correspond to the number of rows of the filter elements 66 so that each time the element 104 is energized, the backwash device is rotated to the next row of filter elements. The backwash operation is initiated automatically by a pressure responsive switch 112, which, in FIG. 1 is shown mounted on the outside of the filter container 20 and having a tube 114 in communication with the interior of the container.

Figure 9:
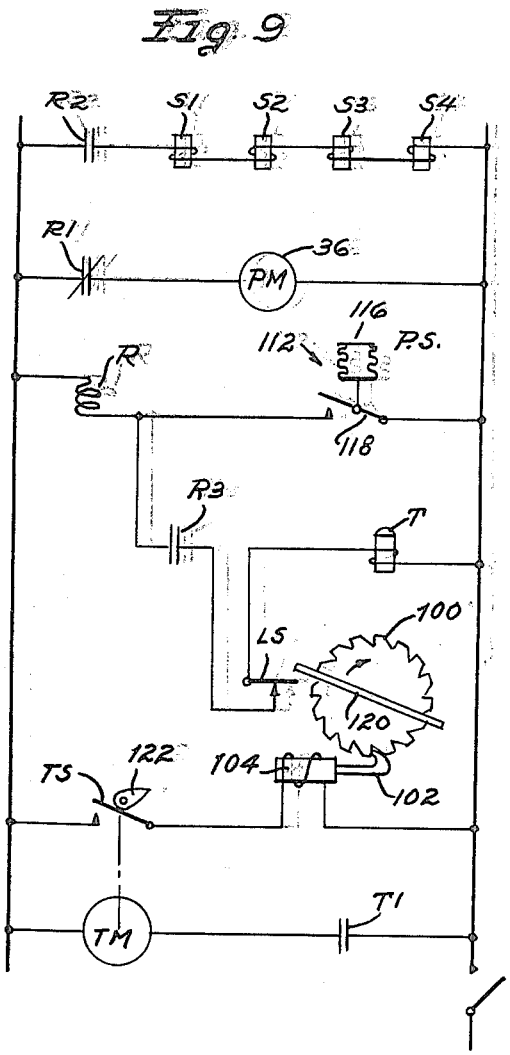
FIG. 9 is a schematic illustration of the control system for the filter apparatus.
Figure 7:
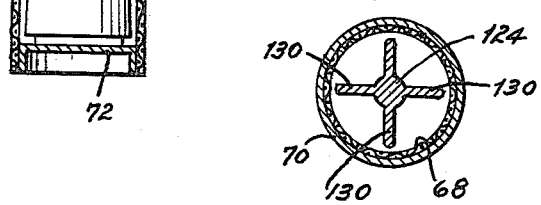
FIG. 7 is a cross sectional view, taken along line 7—7 of FIG. 6.
Figure 8:
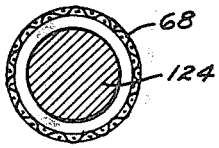
FIG. 8 is another cross sectional view, taken along the line 8—8 of FIG 6.

Referring now to the control system of FIG. 9, the pressure responsive switch 112 is diagrammatically represented as comprising a bellows 116 having a movable end wall connected to a switch 118. In series with the pressure responsive switch 118 there is a control relay coil R having a pair of normally closed contacts R1 in series with pump motor 36. A second pair of normally open contacts R2 are in series with the serially connected solenoids S1, S2, S3 and S4. A third pair of normally open contacts R3 provide a holding circuit for relay coil R and in series with contacts R3 are a timer T and a limit switch LS. An actuator 120, rotatable with the ratchet wheel 100, opens the limit switch LS to restore the control system for filtering operation. The ratchet power element 104 is in series circuit with a timer switch TS that controls operation of the solenoid and is represented as including a cam 122 driven by a motor TM that is controlled by timer T.

In order to effect an even distribution of the force of the backwash water within and throughout the lengths of the filter elements 66, I provide within each of said elements a tapered displacement member 124. The displacement member 124 is arranged with its base at the bottom of the filter tube 68 so that the capacity of the tube is gradually decreased from top to bottom. This distributes the water pressure, which would otherwise be greatest at the bottom of the tube, over the entire area of the screen to effect better dislodgement of dirt particles caught in the interstices of the screen. The upper end of the displacement member 124 is preferably positioned just below the water inlet holes 80 and has a rounded upper end 128 and angularly spaced vanes 130 which diffuse the water as it enters the filter tubes whereby to obtain an impinging effect of the water against the screen.

Operation

Assuming that the filtering operation is in effect, the valves S1 and S2 will be open and valves S3 and S4 will be closed and pump 34 will be in operation. The pump maintains the liquid in the filter chamber 52 under pressure which forces the liquid through the filter element screens 68 and up into the outlet chamber 54 whence the clean liquid is conducted from the filter by the pipe 42. When the accumulation of foreign matter on the filter screens 68 becomes such that a predetermined back pressure in the filter chamber 52 closes the pressure responsive switch 112, the control relay R is energized to stop the filtering cycle and start the backwash cycle. It will be apparent that when the relay coil R is energized, R1 opens to stop pump 36, and R2 closes to reverse the normal positions of the solenoid valves S1, S2, S3 and S4. Also, the energization of relay R closed the holding contacts R3 whereupon timer T was energized. This timer T is set such that after a predetermined interval calculated to allow for draining of the water from the now open discharge valve S4, contacts T1 will close to energize the indexing mechanism timer TM. This timer TM rotates the timing cam 122 which periodically closes switch TS. Each time the switch TS is closed, the power element 104 is pulsed and rotates the ratchet wheel 100 to the next row of filter tubes to be backwashed. When the ratchet wheel 100 has been rotated through a one-half revolution, all of the filter elements have been backwashed. On the next pulsing of the element 104, the actuator 120, carried by the ratchet wheel, opens the limit switch LS which as previously mentioned restores the control system and returns the filter to its filtering operation.

While I have shown and described my filter in considerable detail it will be apparent that many variations and changes may be made therein without departing from the spirit and scope of the invention.

I claim:

1. In a liquid filter apparatus having a container, means subdividing said container into a lower filter chamber and an upper outlet chamber, a plurality of hollow filter elements and means securing said elements in said container to depend into said lower chamber, said elements each having an upper open end exposed to said upper chamber, said elements being arranged in radially aligned rows about a common center and the corresponding elements in separate rows being equally spaced from said center, a liquid discharge head rotatably mounted within said outlet chamber, said head comprising a plurality of radial pipes, a vertical conduit to which said pipes are secured and means journalling said conduit for rotation about an axis coincident with said common center, each of said pipes having a plurality of downwardly directed liquid jet discharge means radially spaced apart along the length thereof so as to register with the elements therebeneath, means for supplying liquid to said conduit for flow therethrough and through said pipes to issue from said jets downwardly into said elements, and means for intermittently arcuately advancing said head into sequential registry with said rows of elements.

2. A filter mechanism having a casing enclosing a plurality of axially elongated vertically parallel tubular foraminous filter elements each having an upper open extremity and a closed lower extremity, said elements being arranged in concentric peripheral rows and in radial alignment about a common center and wherein filtrate liquid normally flows radially through said element to accrete contaminants on the exterior thereof, the filtrate being removed through the open ends of said element, respectively, a spray head disposed interiorly of said casing and in spaced relation above the upper ends of said elements, means on said spray head for downwardly directing individual streams of liquid from said spray head into the open upper ends of said elements, means for arcuately moving said spray head about said common center to sequentially register said spray head with successive radial rows of elements, means for halting said spray head in registry with each of said successive rows of elements to inject a substantial quantity of liquid in the form of a stream under pressure through said open upper end of each of said elements in said rows for flow radially through said elements to loosen and remove contaminants previously accreted thereon and automatic pressure responsive control means for periodically actuating said spray head moving means.

(References on following page)

References Cited by the Examiner

UNITED STATES PATENTS

| | | | |
|---|---|---|---|
| 555,773 | 3/96 | Ince | 210—456 X |
| 1,359,162 | 11/20 | Genter | 210—333 X |
| 1,659,459 | 2/28 | Clarke | 165—95 |
| 1,945,839 | 2/34 | Von Maltitz | 210—411 |
| 2,204,349 | 6/40 | Forrest | 210—411 X |
| 2,237,964 | 4/53 | Haught | 210—497 X |
| 2,661,845 | 12/53 | Sullivan | 210—497 X |
| 2,780,363 | 2/57 | Pew | 210—411 X |
| 2,907,466 | 10/59 | Beddow | 210—456 X |
| 2,954,873 | 10/60 | Davis | 210—411 X |
| 2,982,412 | 5/61 | Hirs | 210—108 |
| 3,056,499 | 10/62 | Liddell | 210—108 |
| 3,074,561 | 1/63 | Mummert | 210—333 |
| 3,123,132 | 3/64 | Hedgecock | 210—333 X |

REUBEN FRIEDMAN, *Primary Examiner.*

HERBERT L. MARTIN, *Examiner.*